US009575770B2

(12) United States Patent
Carlson et al.

(10) Patent No.: US 9,575,770 B2
(45) Date of Patent: *Feb. 21, 2017

(54) METHOD OF GRAPHICAL DISPLAY OF HIERARCHICAL HARDLINKS TO FILES IN A FILE SYSTEM

(75) Inventors: Timmothy S. Carlson, Rochester, MN (US); Richard M. Theis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 968 days.

This patent is subject to a terminal disclaimer.

(21) Appl. No.: 13/005,186

(22) Filed: Jan. 12, 2011

(65) Prior Publication Data
US 2011/0107274 A1 May 5, 2011

Related U.S. Application Data

(63) Continuation of application No. 12/194,255, filed on Aug. 19, 2008, now Pat. No. 7,895,535, which is a continuation of application No. 11/186,594, filed on Jul. 21, 2005, now Pat. No. 7,516,422.

(51) Int. Cl.
*G06F 9/44* (2006.01)
*G06F 17/30* (2006.01)

(52) U.S. Cl.
CPC ....... *G06F 9/4443* (2013.01); *G06F 17/30126* (2013.01)

(58) Field of Classification Search
CPC . G06F 17/301; G06F 9/4443; G06F 17/30126

USPC .......................................................... 715/855
See application file for complete search history.

(56) References Cited

U.S. PATENT DOCUMENTS

| 5,392,427 | A | * | 2/1995 | Barrett | G06F 17/30952 |
| | | | | | 707/800 |
| 5,590,320 | A | * | 12/1996 | Maxey | G06F 3/0601 |
| 5,801,702 | A | * | 9/1998 | Dolan et al. | 715/854 |
| 5,819,275 | A | * | 10/1998 | Badger | G06F 17/30067 |
| | | | | | 707/758 |
| 5,832,527 | A | * | 11/1998 | Kawaguchi | |

(Continued)

OTHER PUBLICATIONS

Author: Jerry Peek; Shelley Powers; Tim O'Reilly; Mike Loukides Title: Unix Power Tools, 3rd Edition Date: Oct. 28, 2002 Publisher: O'Reily Media, Inc pp. 1-5.*

(Continued)

*Primary Examiner* — Ajay Bhatia
*Assistant Examiner* — Phoebe Pan
(74) *Attorney, Agent, or Firm* — Brandon C. Kennedy; Feb Cabrasawan; Kennedy Lenart Spraggins LLP

(57) ABSTRACT

Methods, apparatuses, and computer program products are provided for graphical display of hierarchical hardlinks to files in a file system that includes identifying multiple hardlinks for a file, wherein a hardlink comprises a link to a file directly mapping the file into a namespace; displaying relationships among the multiple hardlinks and the file; and providing an option to modify the hardlinks to the file via a button, including: following a pointer from the file having multiple hardlinks to a list of hardlinks to the file by following a Master Hardlink Pointer which is contained in the file and provides a pointer to the hardlink list for the file.

19 Claims, 8 Drawing Sheets

(56) References Cited

U.S. PATENT DOCUMENTS

| | | | |
|---|---|---|---|
| 5,867,161 A * | 2/1999 | Walsh | G06F 3/0481 |
| | | | 707/E17.142 |
| 5,897,638 A * | 4/1999 | Lasser | G06F 17/30171 |
| 5,905,990 A * | 5/1999 | Inglett | |
| 5,963,208 A * | 10/1999 | Dolan et al. | 715/760 |
| 5,987,469 A * | 11/1999 | Lewis | G06F 17/30126 |
| 6,189,019 B1 * | 2/2001 | Blumer et al. | 715/205 |
| 6,327,703 B1 * | 12/2001 | O'Donnell et al. | 717/162 |
| 6,546,393 B1 * | 4/2003 | Khan | G06F 17/30884 |
| 6,922,707 B2 * | 7/2005 | Shimojima et al. | |
| 7,174,513 B1 * | 2/2007 | Nickum | 715/738 |
| 7,191,410 B1 * | 3/2007 | Kruempelmann | G06F 9/4443 |
| | | | 707/E17.005 |
| 7,287,215 B2 * | 10/2007 | Arcuri et al. | 715/206 |
| 7,428,705 B2 * | 9/2008 | Ronald et al. | 715/738 |
| 7,516,422 B2 | 4/2009 | Carlson et al. | |
| 9,003,533 B1 * | 4/2015 | Gummerman | G06F 21/566 |
| | | | 707/678 |
| 9,104,675 B1 * | 8/2015 | Clark | G06F 17/30091 |
| 2001/0045952 A1 * | 11/2001 | Tenev et al. | 345/440 |
| 2002/0059335 A1 * | 5/2002 | Jelbert | 707/500 |
| 2003/0231216 A1 * | 12/2003 | McBrearty et al. | 345/855 |
| 2004/0088316 A1 * | 5/2004 | Cleraux | G06F 17/30067 |
| 2005/0028081 A1 | 2/2005 | Arcuri et al. | |
| 2005/0033777 A1 * | 2/2005 | Moraes | G06F 17/30575 |
| 2005/0108629 A1 * | 5/2005 | Relyea et al. | 715/513 |
| 2006/0106818 A1 * | 5/2006 | Reed et al. | 707/100 |
| 2006/0294039 A1 * | 12/2006 | Mekenkamp | G06F 17/301 |
| 2007/0198458 A1 * | 8/2007 | Pudipeddi | G06F 17/30067 |
| 2008/0235249 A1 * | 9/2008 | Stephens | G06F 17/30589 |
| 2008/0320062 A1 * | 12/2008 | Miyamae | G06F 17/30079 |
| 2015/0347402 A1 * | 12/2015 | McKinion | G06F 17/30233 |
| | | | 707/827 |

OTHER PUBLICATIONS

Office Action, U.S. Appl. No. 12/194,255, Jun. 3, 2010.
Office Action, U.S. Appl. No. 11/186,594, Jan. 16, 2008.
Notice of Allowance, U.S Appl. No. 11/186,594, Jul. 14, 2008.
Notice of Allowance, U.S. Appl. No. 12/194,255, Oct. 18, 2010.
Naoko Ogawa, "Introduction to Solaris [13th Time]," Sunworld, Japan, IDG Japan Inc, Nov. 1, 2000, vol. 10., No. 11, pp. 82-87.
Hideki Koike et al., "Fractal Approaches for Visualizing Huge Hierarchies in Interactive Environment," Transactions of IPS Japan, Japan, IPS Japan, Dec. 1994, vol. 35, No. 12, pp. 2703-2711.

* cited by examiner

METHOD OF GRAPHICAL DISPLAY OF HIERARCHICAL HARDLINKS TO FILES IN A FILE SYSTEM

CROSS-REFERENCE TO RELATED APPLICATION

This application is a continuation application of and claims priority from U.S. patent application Ser. No. 12/194,255, filed on Aug. 19, 2008, now U.S. Pat. No. 7,895,535, which is a continuation of and claims priority from U.S. patent application Ser. No. 11/186,594, filed on Jul. 21, 2005, now U.S. Pat. No. 7,516,422.

BACKGROUND OF THE INVENTION

Field of the Invention

The field of the invention is data processing, or, more specifically, methods, apparatuses, and products for graphical display of hierarchical hardlinks to files in a file system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computers have a foundation layer of software called an operating system that stores and organizes files and upon which applications depend for access to computer resources. In an operating system, the overall structure in which objects such as files are named, stored, and organized is called a file system. File systems are often organized in a namespace that consists of a collection of pathnames used to access the objects stored in the file system. A pathname is a sequence of symbols and names that identifies a file. Every file in the namespace has a name, called a filename, so the simplest type of pathname is just a filename. To access files in directories, a pathname identifies a path to the file starting from a working directory or from a root directory to the file. Various operating systems have different rules for specifying pathnames. In DOS systems, for example, the root directory is named '\', and each subdirectory is separated by an additional backslash. In UNIX, the root directory is named '/', and each subdirectory is followed by a slash. In Macintosh environments, directories are separated by a colon. These pathnames 'map' or 'link' an object into the namespace. Links that directly map an object into the namespace are called 'hardlinks.'

Modern operating systems provide a graphical user interface ("GUI") for viewing and manipulating files and directories in the file system. Traditional GUIs typically represent the file system namespace to a user by categorizing file system objects as either container objects or data objects. Container objects such as directories or folders may include other container objects or directories and are typically placed on the left side of the GUI for the file system. Data objects such as hardlinks to files do not include other objects and are typically placed on the right side of the GUI for the file system.

Data objects such as hardlinks typically have a one-to-one relationship with the underlying file in the file system that they represent. If there are multiple hardlinks to a single file in the file system, however, traditional GUIs display the hardlinks in the right side of the file system GUI as data objects with no indication that other hardlinks to the file exist. The lack of differentiation between files with multiple and singular hardlinks by traditional file system GUIs create confusion and adds difficulty to management of files with multiple hardlinks.

A user, for example, desiring to remove a file from the file system may delete what appears to be a singular hardlink to a file. If the file in fact has multiple hardlinks throughout the namespace, the user will have only removed one of the hardlinks instead of removing the underlying file from the file system. In order for the user to remove the file from the file system using traditional file system GUIs, the user must manually search the entire namespace of the file system and manually delete all the hardlinks associated with the file. The inability to efficiently view and manipulate files with multiple hardlinks in a file system GUI wastes time for users.

SUMMARY OF THE INVENTION

Methods, apparatuses, and computer program products are provided for graphical display of hierarchical hardlinks to files in a file system that includes identifying multiple hardlinks for a file and displaying relationships among the multiple hardlinks and the file. Some embodiments also include a hardlink comprising a link to a file directly mapping the file into a namespace. Graphical display of hierarchical hardlinks to files in a file system also typically includes providing a list of hardlinks to the file and providing in the file a pointer to the list. Some embodiments also include deleting the file having multiple hardlinks, renaming the hardlinks to the file, and displaying the pathnames of the hardlinks to the file.

Displaying relationships among the multiple hardlinks and the file according to embodiments for graphical display of hierarchical hardlinks to files in a file system may also include displaying at least one icon representing the file and representing the number of hardlinks to the file and displaying a distinctive icon representing each hardlink to the file having multiple hardlinks.

Identifying multiple hardlinks for a file according to embodiments for graphical display of hierarchical hardlinks to files in a file system may also include traversing the hierarchical namespace, determining for each hardlink whether the hardlink points to another hardlink, following a pointer from a file having multiple hardlinks to a list of hardlinks to the file and traversing the list.

Deleting a file having multiple hardlinks according to embodiments for graphical display of hierarchical hardlinks to files in a file system may also include following a pointer from the file having multiple hardlinks to a list of hardlinks to the file and deleting all the hardlinks in the list.

Renaming the hardlinks to the file according to embodiments for graphical display of hierarchical hardlinks to files in a file system may also include receiving from a user a new filename, following a pointer from the file having multiple hardlinks to a list of hardlinks to the file, and assigning the new name to the hardlinks in the list.

Displaying the pathnames of the hardlinks to the file according to embodiments for graphical display of hierarchical hardlinks to files in a file system may also include following a pointer from the file having multiple hardlinks to a list of hardlinks to the file, retrieving a name from the hardlink for each hardlink in the list, and traversing the hierarchy to its root to retrieve a path for the hardlink for each hardlink in the list.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for graphical display of hierarchical hardlinks to files in a file system. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DETAILED DESCRIPTION

Figure 1:
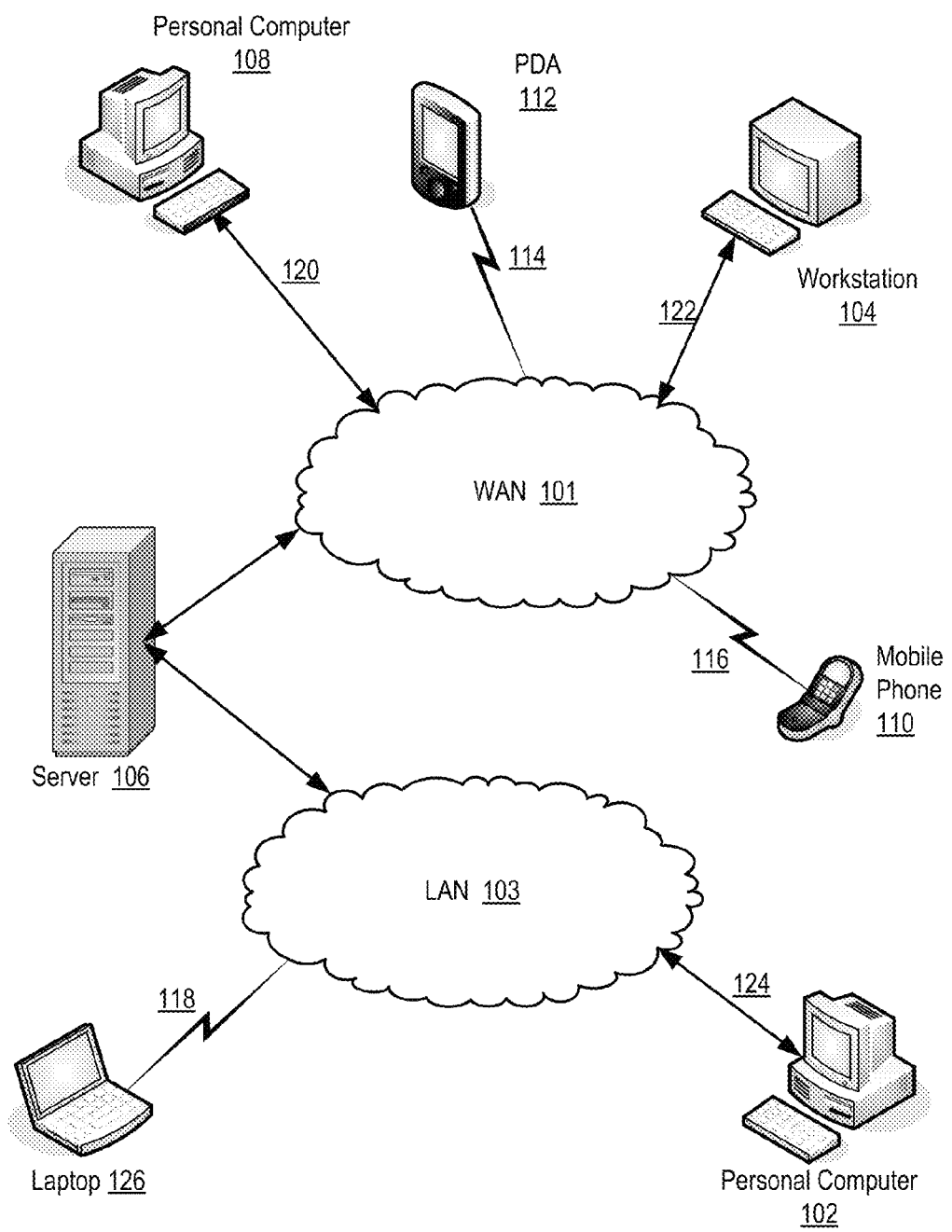
FIG. 1 sets forth a network diagram illustrating an exemplary system for graphical display of hierarchical hardlinks to files in a file system.

Exemplary methods, apparatuses, and products for graphical display of hierarchical hardlinks to files in a file system according to embodiments of the present invention are described with reference to the accompanying drawings, beginning with FIG. 1. FIG. 1 sets forth a network diagram illustrating an exemplary system useful for graphical display of hierarchical hardlinks to files in a file system according to embodiments of the present invention. Each of the devices (108, 112, 104, 110, 102, 126, and 106) of the system of FIG. 1 is capable of graphical display of hierarchical hardlinks to files in a file system according to embodiments of the present invention by identifying multiple hardlinks for a file and displaying relationships among the multiple hardlinks and the file.

The system of FIG. 1 includes a wide area network ("WAN") (101) and a local area network ("LAN") (103). The network connection aspect of the architecture of FIG. 1 is only for explanation, not for limitation. In fact, systems for graphical display of hierarchical hardlinks to files in a file system may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, a server (106) implements a gateway, router, or bridge between a LAN (103) and a WAN (101). In the example of FIG. 1, several exemplary devices including a PDA (112), a computer workstation (104), a mobile phone (110), and personal computer (108) are connected to the WAN (101). Network-enabled mobile phone (110) connects to the WAN (101) through a wireless link (116), and the PDA (112) connects to the WAN (101) through a wireless link (114). In the example of FIG. 1, the personal computer (108) connects to the network (101) through a wireline connection (120), and computer workstation (104) connects to the network (101) through a wireline connection (122). In the example of FIG. 1, the laptop (126) connects to the LAN (103) through a wireless link (118) and the personal computer (102) connects to the LAN (103) through a wireline connection (124).

In the system of FIG. 1, each of the exemplary devices (108, 112, 104, 110, 126, 106, and 102) includes a computer processor and computer memory coupled for data transfer to the processor. The computer memory of each of the computers of FIG. 1 has disposed within it a file system and computer program instructions comprising a graphical hardlink display module. The graphical hardlink display module is capable generally of graphical display of hierarchical hardlinks to files in a file system by identifying multiple hardlinks for a file and displaying relationships among the multiple hardlinks and the file.

The graphical hardlink display module is also capable generally of displaying at least one icon representing the file and representing the number of hardlinks to the file and displaying a distinctive icon representing each hardlink to the file having multiple hardlinks. The graphical hardlink display module is also capable generally of traversing the hierarchical namespace, determining for each hardlink whether the hardlink points to another hard link, following a pointer from a file having multiple hardlinks to a list of hardlinks to the file and traversing the list. The graphical hardlink display module is capable generally of providing a list of hardlinks to the file and providing in the file a pointer to the list. The graphical hardlink display module is also capable generally of deleting a file having multiple hardlinks, including following a pointer from the file having multiple hardlinks to a list of hardlinks to the file and deleting all the hardlinks in the list. The graphical hardlink display module is capable generally of renaming the hardlinks to the file, including receiving from a user a new filename, following a pointer from the file having multiple hardlinks to a list of hardlinks to the file, and assigning the new name to the hardlinks in the list. The graphical hardlinks display module is capable generally of displaying the pathnames of the hardlinks to the file, including following a pointer from the file having multiple hardlinks to a list of hardlinks to the file, retrieving a name from the hardlink for each hardlink in the list, and traversing the hierarchy to its root to retrieve a path for the hardlink for each hardlink in the list.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Graphical display of hierarchical hardlinks to files in a file system in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in graphical display of hierarchical hardlinks to files in a file system according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art. The operating system (154) of FIG. 2 includes a file system (210). File systems provide the overall structure in which file system objects are named, stored, and organized. A file system may include files, directories, and the information needed to locate and access these items. File systems useful in computers according to embodiments of the present invention include High Performance File System ("HPFS"), NT Files System ("NTFS"), HFS Plus, Unix File System ("UFS"), second extended file system ("ext2"), and others as will occur to those of skill in the art.

Figure 2:
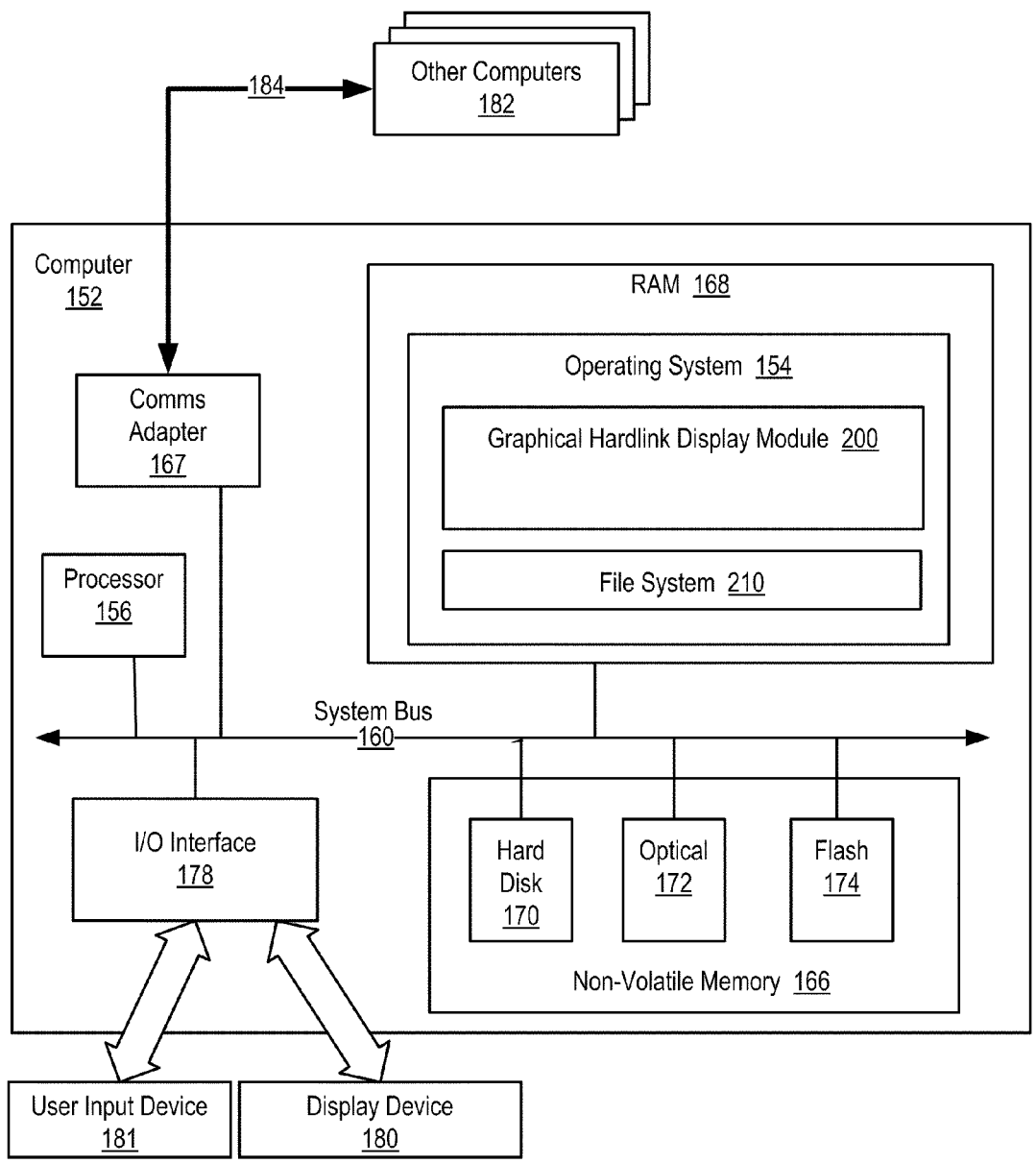
FIG. 2 sets forth a block diagram of automated computing machinery comprising an exemplary computer useful in graphical display of hierarchical hardlinks to files in a file system.

The operating system (154) of FIG. 2 also includes a graphical hardlink display module (200), computer program instructions for graphical display of hierarchical hardlinks to files in a file system according to embodiments of the present invention. The graphical hardlink display module is capable generally of graphical display of hierarchical hardlinks to files in a file system by identifying multiple hardlinks for a file and displaying relationships among the multiple hardlinks and the file. Operating system (154), file system (210), graphical hardlink display module (200) in the example of FIG. 2 are shown in RAM (168), but many components of such software typically are stored in non-volatile memory (166) also. In the example of FIG. 2, the graphical hardlink display module (200) is shown as a subsystem of the operating system (154) for explanation and not limitation. Graphical hardlink display modules in accordance with the present invention may also be implanted as an application outside the operating system (154).

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
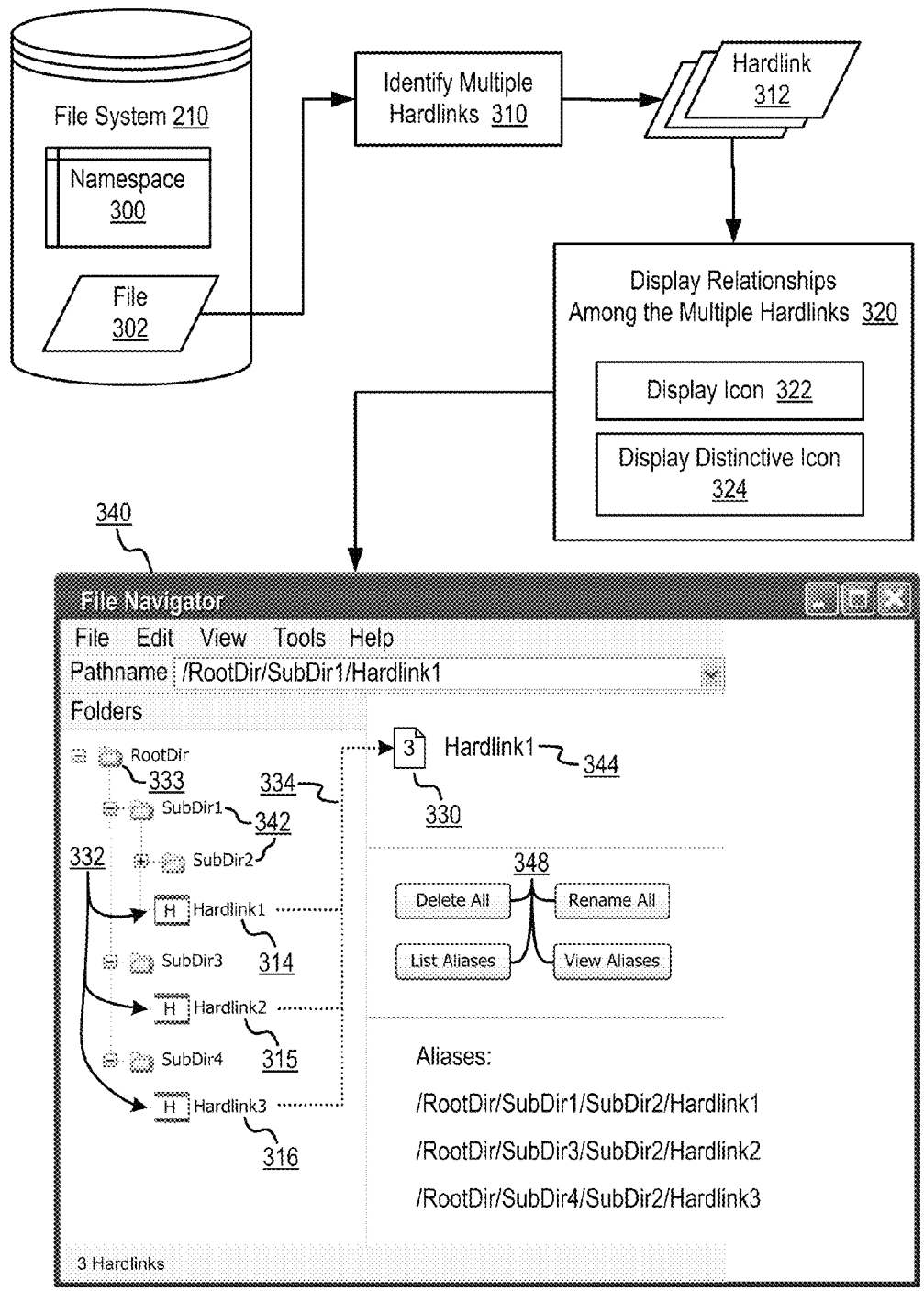
FIG. 3 sets forth a flow chart illustrating an exemplary method for graphical display of hierarchical hardlinks to files in a file system.

For further explanation, FIG. 3 sets forth a flow chart illustrating an exemplary method for graphical display of hierarchical hardlinks to files in a file system (210) according to embodiments of the present invention that includes identifying (310) multiple hardlinks (312) for a file (302) and displaying (320) relationships among the multiple hardlinks (312) and the file (302). As mentioned above, exemplary file systems (210) implemented with namespaces include NTFS, HPFS, UFS, and others as will occur to those of skill in the art. In this specification, graphical display of hierarchical hardlinks to files in a file system (210) according to embodiments of the present invention are discussed primarily with reference to the Unix File System. This is for explanation, and not for limitation. In fact, graphical display of hierarchical hardlinks to files in a file system (210) according to embodiments of the present invention may be carried out with many files systems having namespaces that support files having multiple hardlinks as will occur to those of skill in the art.

As discussed above, file systems typically name, store, and organize objects. Typical file systems, such as for example, the Unix File System, support two main file system objects: files and directories. In the Unix File System, each object is represented by a data structure called an 'i-node.' I-nodes store information about an object such as the object's type, owner, group, mode, size, number of links, last access time, and last modification time. The i-node also contains the physical disk addresses of all the data blocks used to store the contents of the object. Every object of the file system (210) is assigned a unique i-node at the time of an object's creation. That is, one i-node exists for each file in the file system (210). All the i-nodes of a file system (210) are allocated when the file system (210) is created, and each i-node is assigned a unique 'i-number.'

The namespace (300) of FIG. 3 represents a collection of pathnames used to access the files stored in the file system (210). In the Unix File System, pathnames are mapped to files by associating a pathname and i-number for a file (302) in the file system (210). Each direct map between a filename in the namespace (300) and the file (302) itself is called a 'hardlink' and increments the link count of the i-node representing the file (302). Pathnames may also be mapped indirectly to a file. These indirect maps are called 'softlinks.' Such softlinks typically map a pathname to another hardlink instead of the file (302) itself.

By mapping files in the file system (210) to the namespace (300), directories impose a structure on the file system (210) as a whole. A directory can contain some number of hardlinks or other directories. The operating system maintains one special directory for each file system (210) called the 'root' directory. This directory serves as the root of the file system (210) hierarchy. Every other file or directory in the file system (210) is subordinate to the root directory. Any file in the file system (210) can be located through the namespace (300) by specifying a path through a chain of directories starting at the root.

As discussed above, file systems typically name, store, and organize objects, such as files. A file (302) is any aggregation of data stored in file system (210). Examples of files include spreadsheets, word processing documents, images, application configurations, or any other type of aggregation of data as will occur to one skilled in the art. As mentioned above, a file (302) is represented in the Unix File System by a single i-node. The file (302) may however be accessed through the namespace (300) through more than one hardlink. The example of FIG. 3 therefore includes identifying (310) multiple hardlinks (312) for a file (302). Identifying (310) multiple hardlinks (312) for a file (302) according to the method of FIG. 3 may be carried out by traversing the hierarchical namespace (300), determining for each hardlink whether the hardlink points to another hardlink, following a pointer from a file having multiple hardlinks to a list of hardlinks to the file (302), and traversing the list as discussed in more detail below with reference to FIG. 4.

The method of FIG. 3 also includes displaying (320) relationships among the multiple hardlinks (312) and the file (302). Displaying (320) relationships among the multiple hardlinks (312) and the file (302) according to the example of FIG. 3 is carried out by providing a window (340) for file navigation in a graphical user interface ("GUI"). In the example of FIG. 3, the window (340) hierarchically displays container objects (333, 342) and multiple hardlinks (314, 315, 316) to a file with respect to other objects in the file system (210). As mentioned above, container objects serve as conduits to other objects. For example, directories are container objects because directories contain other objects such as files and other directories. Multiple hardlinks (314, 315, 316) of FIG. 3 point to a single hardlink (344) corresponding to file (302). Window (340) of FIG. 3 also contains buttons (348) for manipulating files with multiple hardlinks. Buttons (348) of FIG. 3 allow a user to delete all the hardlinks associated with a file (302), rename all the hardlinks associated with a file (302), and view and list aliases associated with a file (302).

In the exemplary method of FIG. 3, displaying (320) relationships among the multiple hardlinks (312) and the file (302) also includes displaying (322) at least one icon (330) representing the file and representing the number of hardlinks to the file (302). In the example of FIG. 3, the icon representing the file and representing the number of hardlinks to the file (302) is an icon of a document representing a file and the icon (330) contains the number '3' to represent that the file system (210) contains three hardlinks in the namespace (300) associated with the file (302).

While the example of FIG. 3 includes an icon with a number within it to represent the number of hardlinks to the file, this is for explanation, and not for limitation. The number of hardlinks to file (302) may be represented by any icon (330) or attribute of an icon such as the color of an icon, the shape of an icon, the size of an icon, animating an icon, or any other manner as will occur to one skilled in the art.

In the example of FIG. 3, a single icon (330) represents both the file and the number of hardlinks to the file is shown. Again, this is for explanation and not limitation. In fact, more than one icon may be used to represent the file (302) and represent the number of hardlinks to the file (302). Having at least one icon (330) representing the file (302) and representing the number of hardlinks to the file (302) advantageously allows users to visually determine which files among many that may be listed in window (340) have multiple hardlinks.

In the exemplary method of FIG. 3, displaying (320) relationships among the multiple hardlinks (312) and the file (302) also includes displaying (324) two distinctive icons (332, 334) each representing each hardlink (314, 315, 316) to the file (302) having multiple hardlinks. In the example of FIG. 3, two distinctive icons (332, 334) represent each hardlink to the file (302) having multiple hardlinks. The first distinctive icon (332) of FIG. 3 for files with multiple hardlinks is displayed with the name of each hardlink (314, 315, 316) in window (340) along with other container objects. Distinctive icon (332) of FIG. 3 is differentiated from icon (333) representing directories in the file system (210) indicating that the distinctive icon (332) represents a hardlink to a file having multiple hardlinks. The other distinctive icon (334) of FIG. 3 is implemented as a dotted arrow from multiple hardlinks (314, 315, 316) of window (340) to the singular hardlink (344) representation of file (302).

In FIG. 3, both distinctive icons (332 and 334) are used for displaying (324) a distinctive icon representing each hardlink (314, 315, 316) to the file (302) having multiple hardlinks. Using the two distinctive icons (332, 334) is for explanation, not for limitation. In fact, any number of distinctive icons may be used for displaying (324) a distinctive icon representing each hardlink (314, 315, 316) to the file (302) having multiple hardlink in accordance with the present invention.

Because file systems (210) often associate numerous hardlinks to a file (302), displaying (324) all distinctive icons representing each hardlink to the file having multiple hardlinks may clutter the file navigator window (340) creating an unappealing visual appearance. The windows (340) for displaying (320) relationships among the multiple hardlinks (312) may provide for displaying a limited number of the distinctive icons representing each hardlink to the file having multiple hardlinks.

Distinctive icon (332) of FIG. 3 containing an 'H' and distinctive icon (334) composed of a dotted arrow are for explanation, not for limitation. In fact, any differentiation between the distinctive icon representing the hardlink and the folders in the left side (342) of the file navigator window (340) may be used in the example of FIG. 3 such as, for example, using a different shape, size, color, highlighting, or any other alteration as will occur to one skilled in the art.

Figure 4:
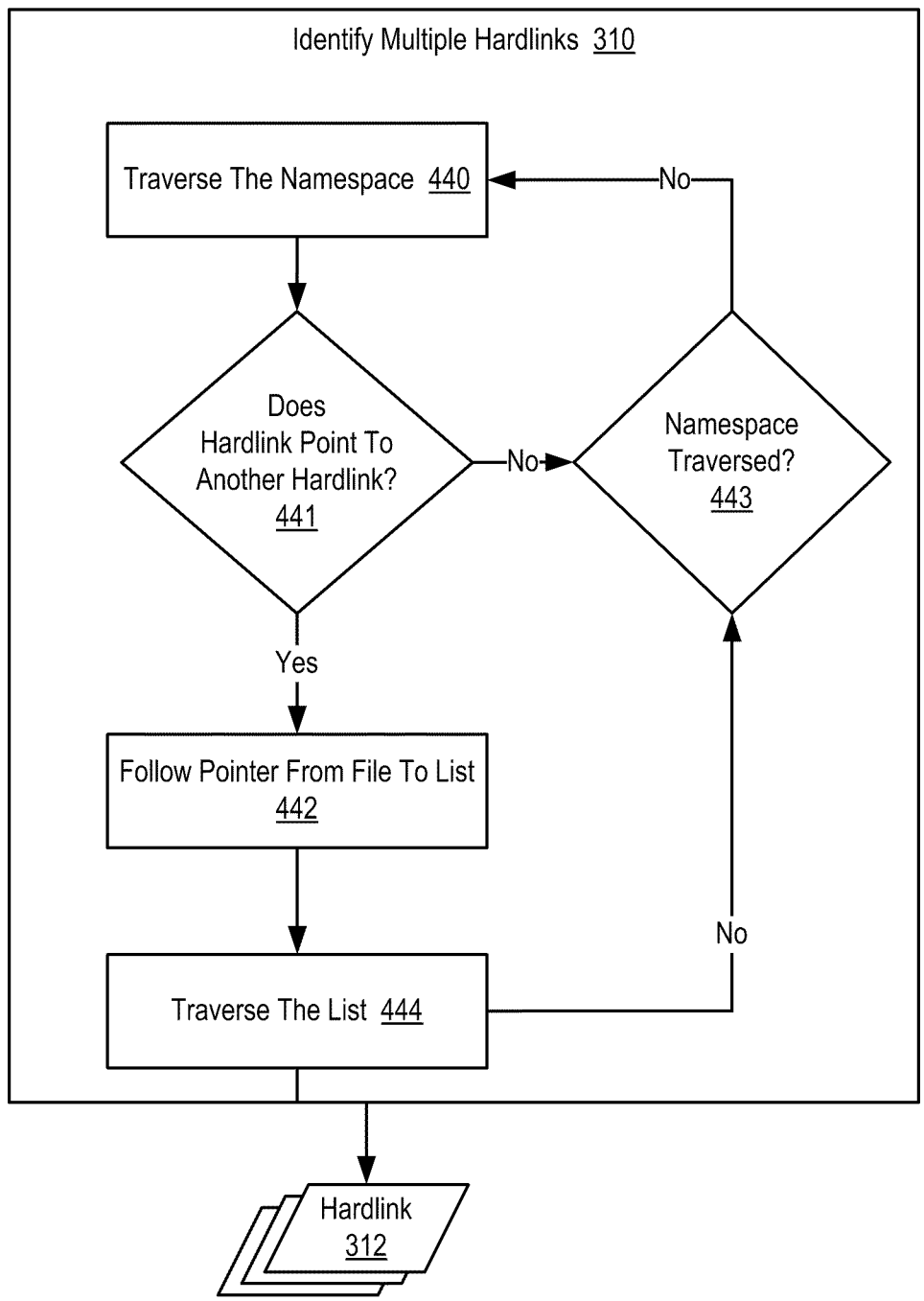
FIG. 4 sets forth another flow chart illustrating an exemplary method for graphical display of hierarchical hardlinks to files in a file system.

For further explanation, FIG. 4 sets forth a flow chart illustrating an exemplary method for identifying (310) multiple hardlinks (312) for a file. Identifying (310) multiple hardlinks (312) for a file according to the method of FIG. 4 includes traversing (440) the hierarchical namespace and determining for each hardlink whether the hardlink points to another hardlink. In the exemplary method of FIG. 4, traversing (440) the hierarchical namespace typically begins at the root directory and is carried out by scanning the directory structure for hardlinks. In the Unix File System, for example, '/' represents the root directory in the namespace and is associated with a directory structure containing all the entries in the root directory. As mentioned above, hardlinks are directory entries that directly map a filename in the namespace to the i-node representing the file. Each directory entry creating a hardlink contains a filename such as 'user.dat' and an i-number associated with a specific i-node. As mentioned above, directory entries may also create links to subdirectories. Directory entries that link to subdirectories contain a reference to the location where the subdirectory's entries are stored. The Unix File System represents subdirectories with i-nodes, but these i-nodes contain a different structure than i-nodes representing files. Traversing (440) the hierarchical namespace may be carried out by traversing the root directory and all subordinate directories in the namespace by using a repetitive or recursive algorithm and identifying from each directory entry the hardlinks in the hierarchical namespace.

In the exemplary method of FIG. 4, determining (441) for each hardlink whether the hardlink points to another hardlink may be carried out by scanning a 'Next Link Pointer' field of each hardlink. A hardlink does not point to another hardlink if the 'Next Link Pointer' field contains a null value. A non-null value in the 'Next Link Pointer' field indicates that multiple hardlinks for a file exist.

If the hardlink does not point to another hardlink, then the method of FIG. 4 includes determining (443) whether the hierarchical namespace has been traversed. If the namespace has not been traversed the method of FIG. 4 continues traversing (440) the hierarchical namespace.

If the hardlink does point to another hardlink, the method of FIG. 4 includes following (442) a pointer from a file having multiple hardlinks to a list of the hardlinks. Following (442) a pointer from a file having multiple hardlinks to a list of the hardlinks according to the method of FIG. 4 may be carried out by following a 'File Pointer' field of a hardlink found while determining (441) for each hardlink whether the hardlink points to another hardlink to the file the hardlink represents. In the exemplary method of FIG. 4, following (442) a pointer from a file having multiple hardlinks to a list of hardlinks to the file may also be carried out by following a 'Master Hardlink Pointer' field of the file to the master hardlink associated with the file.

After following (442) a pointer from a file having multiple hardlinks to a list of hardlinks to the file, the method of FIG. 4 continues by traversing (444) the list. Traversing (444) the list according the example of FIG. 4 may be carried out by following a 'Next File Pointer' field in a hardlink associated with a file to another hardlink associated with a file. Traversing (444) the list may be carried out by following a 'Next File Pointer' field from one hardlink to another in the hardlink list until the current hardlink traversed matches the first hardlink traversed. One way of determining whether the current hardlink traversed matches the first hardlink traversed includes comparing the pointers of the current hardlink traversed with the first hardlink traversed. If pointers to the current hardlink traversed and the first hardlink traversed match, then the entire hardlink list has been traversed. In FIG. 4, traversing (444) the list will continue if pointers to the current hardlink traversed and the first hardlink traversed do not match.

After traversing (444) the list, the method of FIG. 4 includes determining (443) whether the namespace has been traversed. If the namespace has not been traversed the method of FIG. 4 continues traversing (440) the hierarchical namespace. The method of FIG. 4 typically continues until all portions of the namespace have been traversed.

Figure 5:
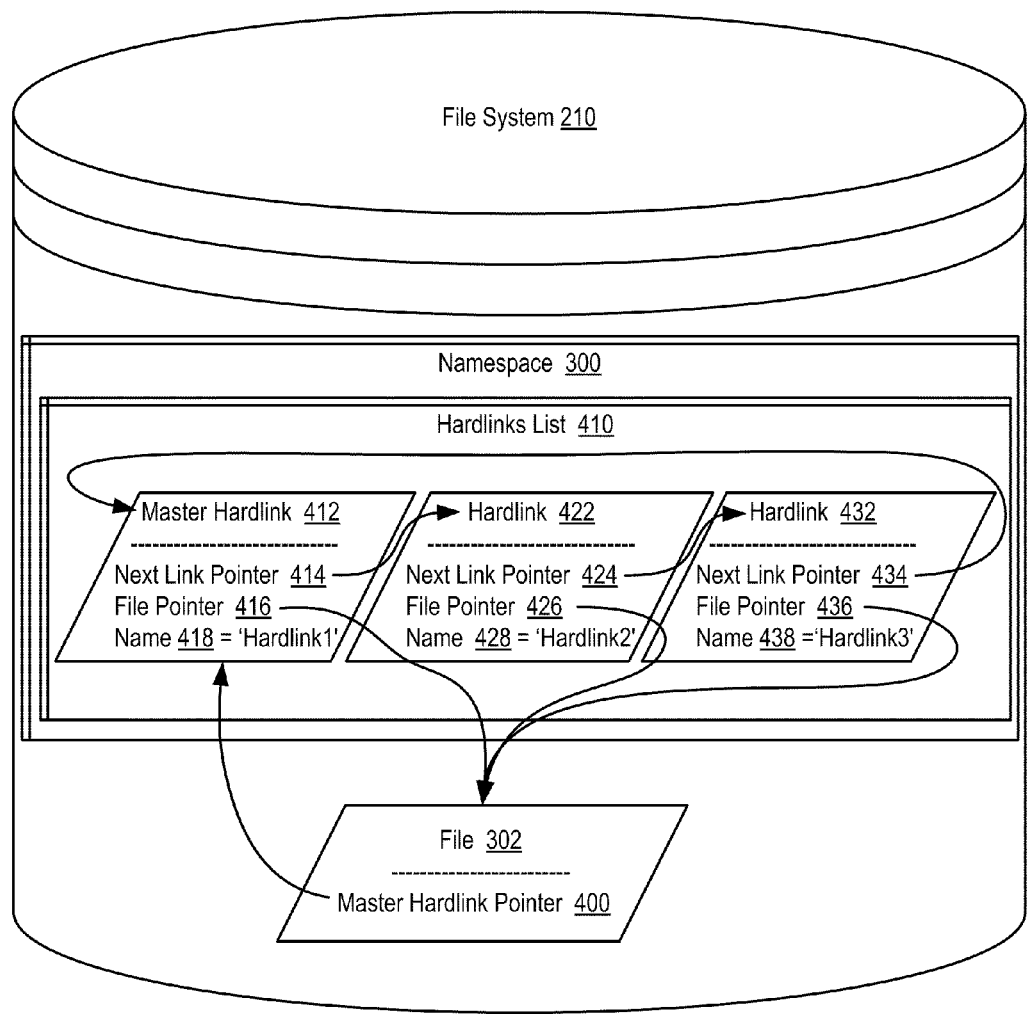
FIG. 5 sets forth a line drawing illustrating an exemplary method for graphical display of hierarchical hardlinks to files in a file system according to embodiments of the present invention.

For further explanation, FIG. 5 sets forth a line drawing illustrating aspects of the method of identifying multiple hardlinks for a file discussed above with reference to FIG. 4. As discussed above, identifying multiple hardlinks for a file typically includes traversing the hierarchical namespace and determining for each hardlink whether the hardlink points to another hardlink. Determining for each hardlink whether the hardlink points to another hardlink may include scanning a 'Next Link Pointer' field of each hardlink. The example of FIG. 5 shows a 'Next Link Pointer' field (414, 424, 434) of each hardlink (412, 422, 432) useful in determining (441) for each hardlink whether the hardlink points to another hardlink. In FIG. 5, each 'Next Link Pointer' field (414, 424, 434) contains a reference to another hardlink associated with file (302). In the example of FIG. 5, 'Next Link Pointer' (414) references hardlink (422); 'Next Link Pointer' (424) references hardlink (432); and 'Next Link Pointer' (434) references hardlink (412). This linked list structure composed of hardlinks (412, 422, 432) provides a list (410) of hardlinks to the file (302). This hardlink list (410) contains all the hardlinks that map file (302) into the namespace (300) of file system (210). A hardlink in the example of FIG. 5 does not point to another hardlink if the 'Next Link Pointer' field contains a null value. A non-null value in the 'Next Link Pointer' field however indicates that multiple hardlinks for a file exist.

As discussed above, identifying multiple hardlinks for a file typically also includes following a pointer from a file having multiple hardlinks to a list of hardlinks to the file if the hardlink does point to another hardlink. Following a pointer from a file having multiple hardlinks to a list of hardlinks to the file may be carried out by following a 'File Pointer' field of a hardlink. The example of FIG. 5 shows a 'File Pointer' field (416, 426, 436) of each hardlink (412, 422, 432) useful in following (442) a pointer from a file having multiple hardlinks to a list of hardlinks to the file. 'File Pointer' fields (416, 426, 436) contain references to file (302) that associate each hardlink (412, 422, 432) with file (302). In the Unix File System, the reference (416, 426, 436) from a hardlink to the file (302) is the i-number associated with the file (302). The example of FIG. 5 also shows a 'Master Hardlink Pointer' field (400) contained in a file (302). A master hardlink (412) is useful in following a pointer from a file having multiple hardlinks to a list of hardlinks to the file. In the example of FIG. 5, a 'Master Hardlink Pointer' field (400) of the file (302) contains a reference to the master hardlink (412) representing the file (302) in the namespace (300) of the file system (210). The 'Master Hardlink Pointer' field (400) advantageously provides in the file (302) a pointer (400) to the hardlink list (410) that facilitates identifying (310) multiple hardlinks for a file (302) according to embodiments of the present invention. Because 'Master Hardlink Pointer' (400) of FIG. 5 serves as an entry point to the hardlink list (410) from file (302), hardlink is called the 'Master Hardlink' (412).

After following a pointer from a file having multiple hardlinks to a list of hardlinks to the file, identifying multiple hardlinks for a file typically continues by traversing the list. Traversing the list may be carried out by following a 'Next File Pointer' field in a hardlink associated with a file to another hardlink associated with a file. The example of 5 shows a 'Next File Pointer' field (414, 424, 434) of a hardlink (412, 422, 432) useful in traversing (444) the list. In FIG. 5, each 'Next File Pointer' field (414, 424, 434) of a hardlink (412, 422, 432) references the next hardlink in the hardlink list (410).

Traversing the list may be carried out by following a 'Next File Pointer' field from one hardlink to another in the hardlink list until the current hardlink traversed matches the first hardlink traversed. One way of determining whether the current hardlink traversed matches the first hardlink traversed includes comparing the pointers of the current hardlink traversed with the first hardlink traversed. If pointers to the current hardlink traversed and the first hardlink traversed match, then the entire hardlink list has been traversed.

Having identified files with multiple hardlinks, it may be advantageous to delete one or more of the multiple hardlinks to the file. For further explanation therefore, FIG. 6 sets forth a flow chart illustrating an exemplary method for graphical display of hierarchical hardlinks to files in a file system according to embodiments of the present invention that includes deleting (502) a file (302) having multiple hardlinks. Deleting (502) a file (302) having multiple hardlinks according to the example of FIG. 6 includes following (504) a pointer (400) from the file (302) having multiple hardlinks to a list (410) of hardlinks to the file (302), and deleting (506) all the hardlinks in the list (410).

Figure 6:
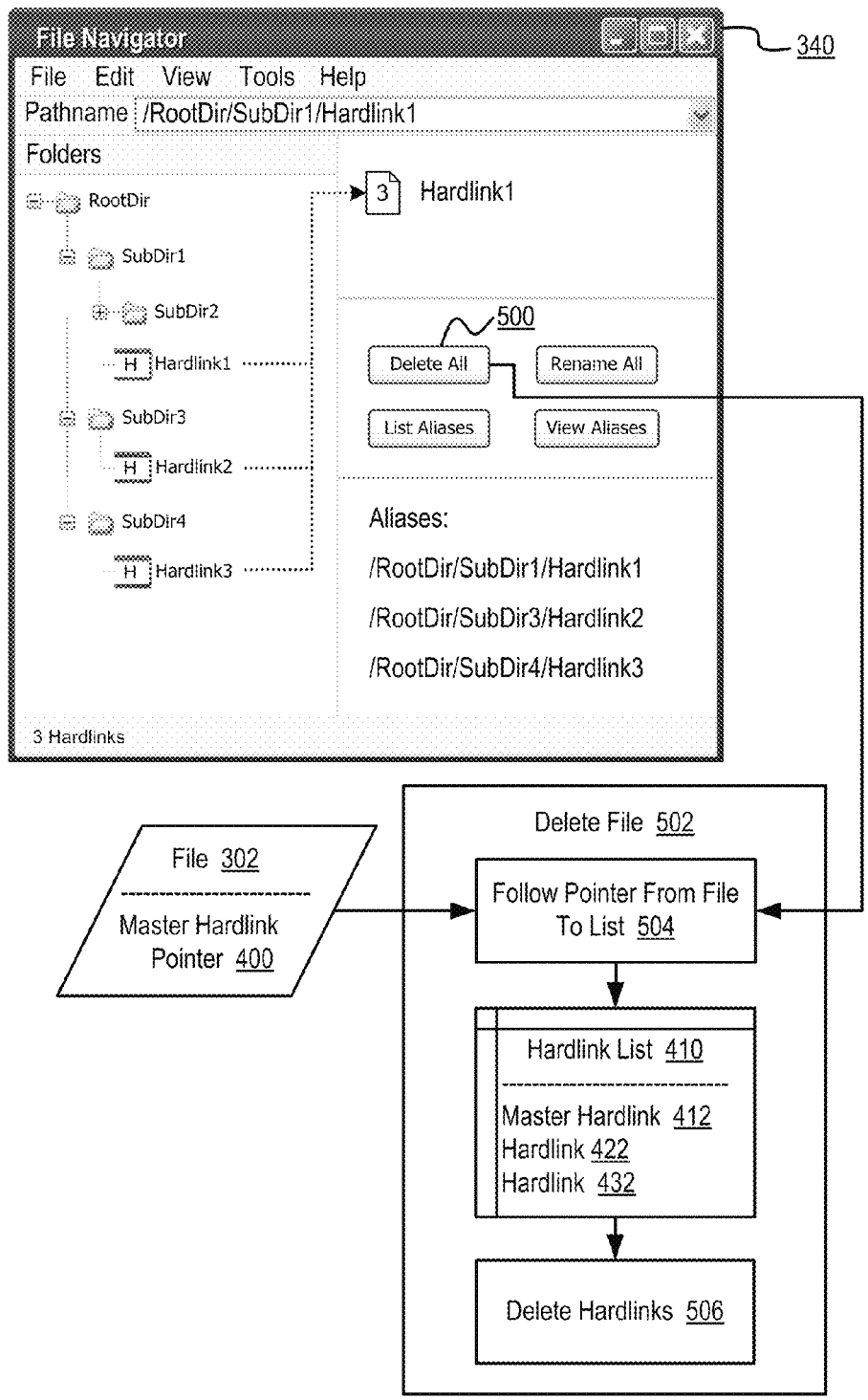
FIG. 6 sets forth another flow chart illustrating an exemplary method for graphical display of hierarchical hardlinks to files in a file system.

In the exemplary method of FIG. 6, the file navigator window (340) contains a 'Delete All' button (500) that advantageously allows a user to delete all hardlinks (412, 422, 432) to a file (302) upon locating a single hardlink. The 'Delete All' button (500) of FIG. 6 eliminates searching through the namespace and deleting each hardlink to a file (302) individually.

In the exemplary method of FIG. 6, following (504) a pointer (400) from the file (302) having multiple hardlinks to a list (410) of hardlinks to the file (302) may be carried out by following the 'Master Hardlink Pointer' field (400) of the file (302) to the master hardlink (412) associated with the file (302). As mentioned above, the master hardlink (412) is an element of the hardlink list (410) containing all the hardlinks representing file (302) in the namespace. The master hardlink (412) serves as an entry point to the hardlink list (410) from file (302). In FIG. 6, the hardlink list (410) contains three hardlinks: master hardlink (412), hardlink (422), and hardlink (432).

In the exemplary method of FIG. 6, deleting (506) all the hardlinks in the list (410) may be carried out by unlinking each filename associated with a hardlink from the file (302) itself. Unlinking a filename from the file (302) removes the hardlink entry from the directory containing the hardlink. Unlinking each filename associated with a hardlink from the file (302) itself may be carried out by an iterative algorithm that traverses the hardlink list (410) that utilizes a function, for example, similar to the following psuedocode function 'remove( )':

int remove(const char *path);

The exemplary remove( ) function above removes a directory entry named by 'path' and decrements a link count of an i-node representing the file. When the link count of the i-node representing the file reaches zero, the space in the file system occupied by the file is deallocated and the file ceases to exist.

Having identified files with multiple hardlinks, it may be advantageous to rename one or more of the multiple hardlinks to the file. For further explanation therefore, FIG. 7 sets forth a flow chart illustrating an exemplary method for graphical display of hierarchical hardlinks to files in a file system according to embodiments of the present invention that includes renaming (602) the hardlinks to the file (302). Renaming (602) the links to the file (302) according the exemplary method of FIG. 7 includes receiving (604) from a user a new filename (601), following (606) a pointer (400) from the file (302) having multiple hardlinks to a list (410) of hardlinks to the file (302), and assigning (607) the new name (601) to the hardlinks in the list (410).

Figure 7:
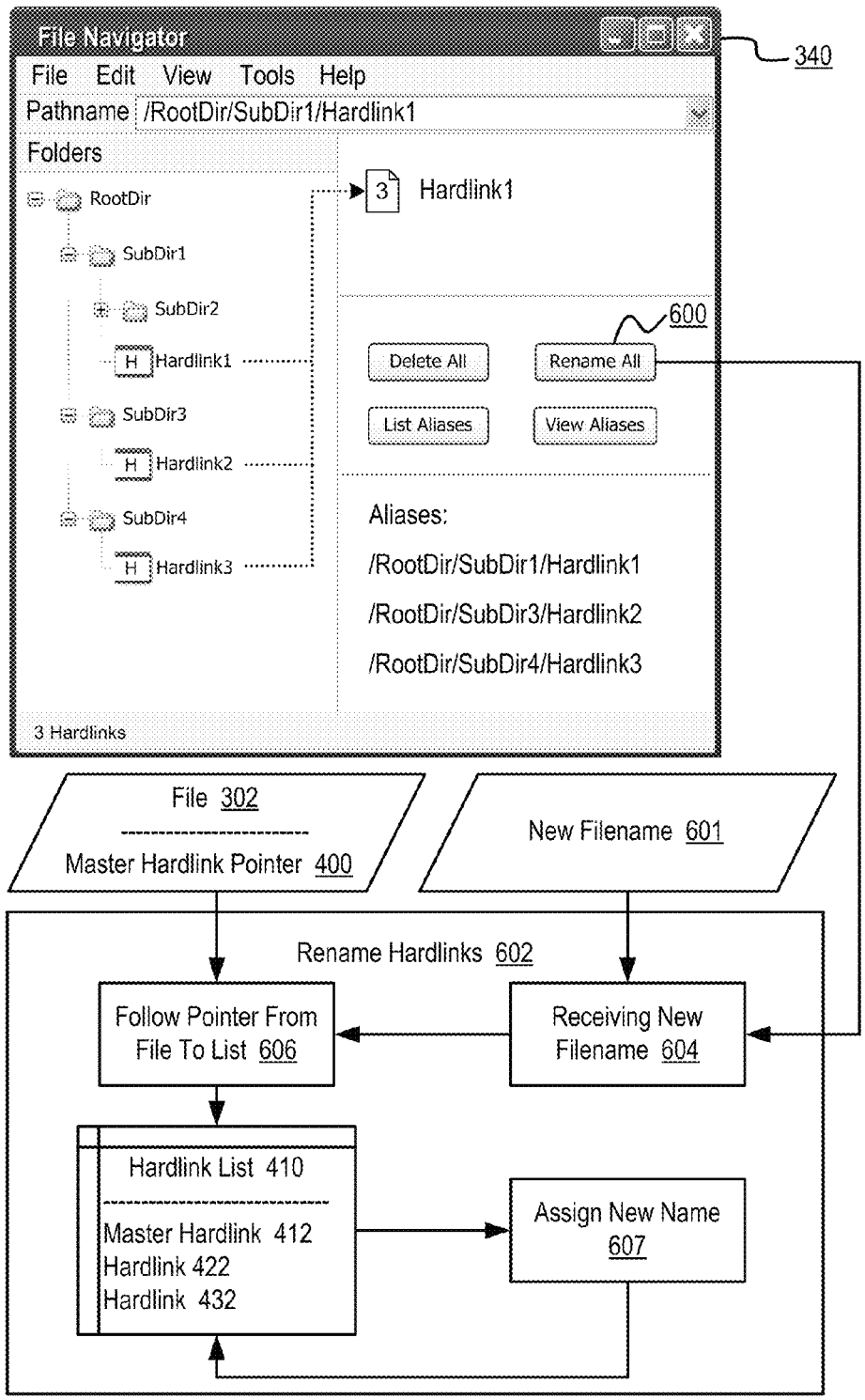
FIG. 7 sets forth another flow chart illustrating an exemplary method for graphical display of hierarchical hardlinks to files in a file system.

In the exemplary method of FIG. 7, the file navigator window (340) contains a 'Rename All' button (600) that advantageously allows a user to rename all the hardlinks (412, 422, 432) to a file (302) upon locating one hardlink. Invoking the 'Rename All' button (600) of FIG. 7 eliminates having to search through the namespace and renaming each hardlink to a file (302) individually.

In the exemplary method of FIG. 7, receiving (604) from a user a new filename (601) may be carried out by providing the user a text box that permits the entry of characters comprising the new filename (601). Receiving (604) from a user a new filename (601) according the example of FIG. 7 may also include validating the characters comprising the new filename (601) to ensure the new filename (601) conforms to requirements of the file system. In the example of FIG. 7, receiving (604) from a user a new filename (601) may also include storing the new filename (601) in electronic storage.

In the exemplary method of FIG. 7, following (606) a pointer (400) from the file (302) having multiple hardlinks to a list (410) of hardlinks to the file (302) may be carried out by following the 'Master Hardlink Pointer' field (400) of the file (302) to the master hardlink (412) associated with the file (302). As mentioned above, the master hardlink (412) is an element of the hardlink list (410) containing all the hardlinks representing file (302) in the namespace. The master hardlink (412) serves as an entry point to the hardlink list (410) from file (302). In FIG. 7, the hardlink list (410) contains three hardlinks: master hardlink (412), hardlink (422), and hardlink (432).

In the exemplary method of FIG. 7, assigning (607) the new name (601) to the hardlinks in the list (410) may include renaming each filename associated with the hardlinks (412, 422, 432) in the hardlink list (410). Renaming a filename associated with a hardlink may include assigning the value of the new filename (601) to the value of 'Name' field of a hardlink. Assigning (607) the new name (601) to the hardlinks in the list (410) according the example of FIG. 7 may be carried out by an iterative algorithm traversing the hardlink list (410) that utilizes a function, for example, similar to following psuedocode function 'rename( )':

int rename(const char *old, const char *new);

The exemplary rename( ) function changes the name of the file whose name is contain in 'old' to the name contained in 'new.' In the example of FIG. 7, the filename currently associated with each hardlink (412, 422, 432) represents 'old' and the new filename (601) represents 'new.'

Having identified files with multiple hardlinks, it may be advantageous to display one or more of the multiple hardlinks to the file. For further explanation, FIG. 8 sets forth a flow chart illustrating an exemplary method for graphical display of hierarchical hardlinks to files in a file system according to embodiments of the present invention that includes displaying (702) the pathnames of the hardlinks to the file (302). Displaying (702) the pathnames (709) of the hardlinks to the file (302) according the exemplary method of FIG. 8 includes following (706) a pointer (400) from the file (302) having multiple hardlinks to a list (410) of hardlinks to the file (302), retrieving (707) a name from the hardlink for each hardlink in the list (410), and traversing (708) the hierarchy to its root to retrieve a path for the hardlink for each hardlink in the list (410).

Figure 8:
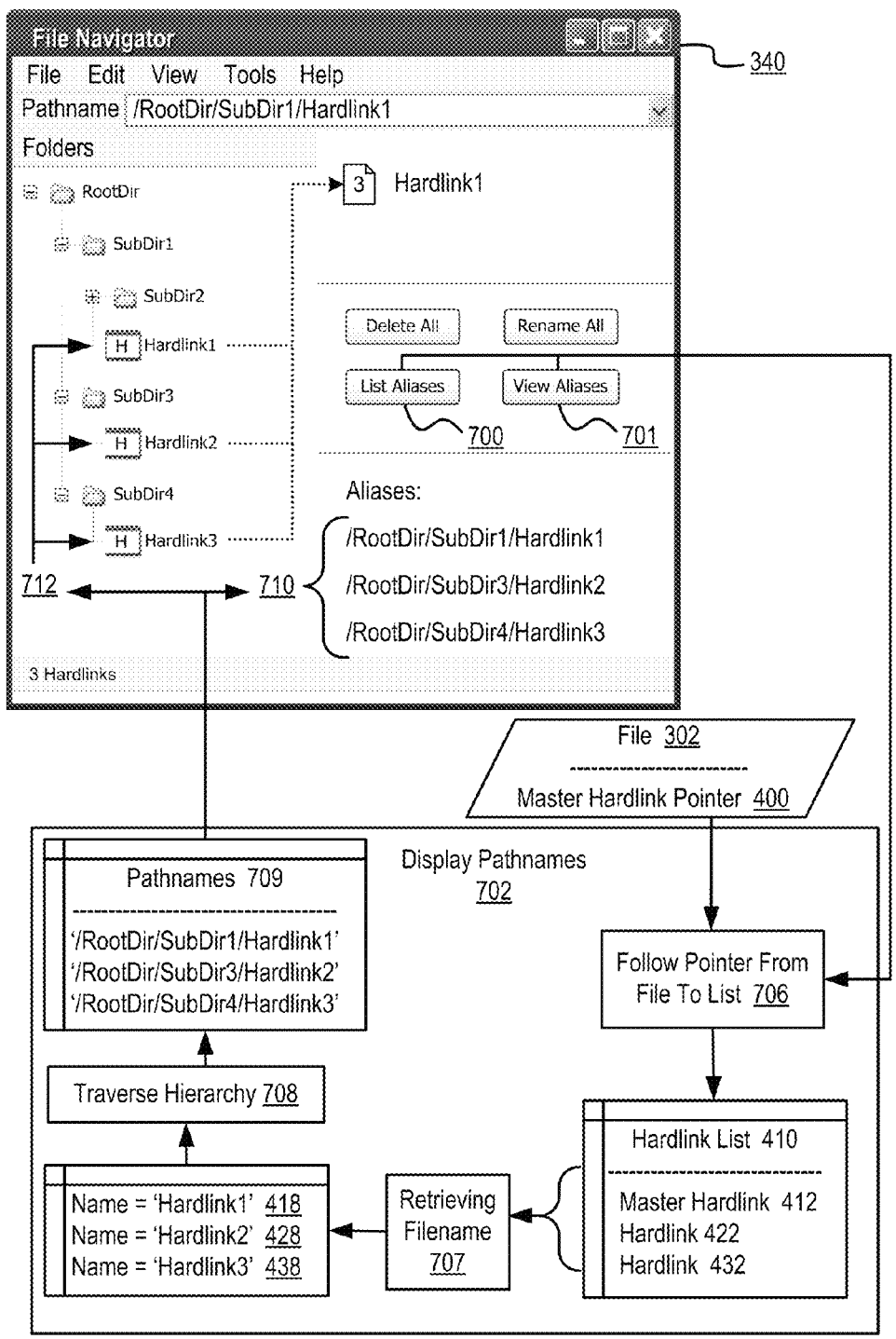
FIG. 8 sets forth another flow chart illustrating an exemplary method for graphical display of hierarchical hardlinks to files in a file system.

In the exemplary method of FIG. 8, the file navigator window (340) contains a 'List Aliases' button (700) that advantageously allows a user to view the display of all the textual representations (710) of the pathnames (709) of the hardlinks (412, 422, 432) to a file (302). Displaying all the textual representation (710) of the pathnames of the hardlinks (412, 422, 432) permits a user to easily find other locations in the namespace of hardlinks representing the file (302).

In the exemplary method of FIG. 8, the file navigator window (340) also contains a 'View Aliases' button (701) that advantageously allows a user to display graphical representations (712) of the pathnames (709) of the hardlinks (412, 422, 432) to a file (302). Displaying graphical representations (712) of the pathnames of the hardlinks (412, 422, 432) aids users in visualizing other locations in the namespace of hardlinks representing file (302).

In the exemplary method of FIG. 8, following (706) a pointer (400) from the file (302) having multiple hardlinks to a list (410) of hardlinks to the file (302) may be carried out by following the 'Master Hardlink Pointer' field (400) of the file (302) to the master hardlink (412) associated with the file (302). As mentioned above, the master hardlink (412) is an element of the hardlink list (410) containing all the hardlinks representing file (302) in the namespace. The master hardlink (412) serves as an entry point to the hardlink list (410) from file (302). In FIG. 8, the hardlink list (410) contains three hardlinks: master hardlink (412), hardlink (422), and hardlink (432).

In the exemplary method of FIG. 8, retrieving (707) a name from the hardlink for each hardlink in the list (410) may include scanning the value of the 'Name' field (418, 428, 438) of each hardlink (412, 422, 432) in the hardlink list (410). Retrieving (707) a name from the hardlink for each hardlink in the list (410) according the example of FIG. 8 may be carried out by an iterative algorithm traversing the hardlink list (410) that utilizes, for example, the following pseudocode structures and functions:

```
void readhardlink(struct dirent *hardlink);
struct dirent {
    long            d_inode;
    char            *d_name;
    struct dirent   *next_link;
};
```

The exemplary readhardlink( ) function reads the directory entry for a hardlink in the hardlink list (410) of type 'struct dirent.' The 'd_inode' field of the structure contains the i-number of a hardlink (412, 422, 423) associated with the i-node representing file (302). The 'd_name' field of the structure contains a filename (418, 428, 438) for each hardlink (412, 422, 423). The 'next_link' field contains a pointer to the next directory entry for a hardlink in the hardlink list (410).

In the exemplary method of FIG. 8, traversing (708) the hierarchy to its root to retrieve a path for the hardlink for each hardlink in the list (410) may include for each hardlink (412, 422, 432) in the list (410) scanning the current directory for the '. .' entry, following the '. .' entry to the parent directory, and reading the name of the previous directory. Each directory in the Unix File System contains entries for itself ('.') and its parent ('. .'). The '.' entry contains the i-number for the i-node representing the directory itself, and the '. .' entry contains the i-number for the i-node representing the parent directory. The '.' and '. .' entries of the root directory both reference the i-node for the root directory. Scanning the current directory for the '. .' entry, following the '. .' entry to the parent directory, and reading the name of the previous directory according to the example of FIG. 8 may be carried out using an iterative or recursive algorithm until the '.' and '. .' entries reference the same i-number. Reading the name of the previous directory according to the example of FIG. 8 may include creating a pathname (709) by concatenating the filename and the directory names during each iteration or recursive call.

In the exemplary method of FIG. 8, displaying (702) the pathnames (709) may be carried out by displaying the pathnames (709) in a textual format (710) in the file navigator window (340). Displaying (702) the pathnames (709) according to the example of FIG. 8 may also be carried out by displaying the pathnames (709) in a graphical format (712) that visually displays the locations of the hardlinks (412, 422, 432) in the namespace.

Exemplary embodiments of the present invention are described largely in the context of a fully functional computer system for graphical display of hierarchical hardlinks to files in a file system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of graphical display of hardlinks to files in a file system, the method comprising:
    identifying hardlinks to a file, wherein each of the hardlinks to the file comprises a file system data object including a field representing a link to the file directly mapping the file into a namespace of the file system and a field representing a link to another hardlink pointing to the file, and wherein identifying the hardlinks to the file includes:
        following a pointer from the file to a master hardlink of a list of hardlinks to the file, wherein the file includes a field representing a link to the master hardlink pointing to the file; and
        determining for each hardlink in the list of hardlinks whether each hardlink points to another hardlink by scanning the field representing the link to another hardlink pointing to the file;
    displaying relationships among the hardlinks and the file;
    receiving, via a user interface element, a command to modify the hardlinks to the file; and
    for each given hardlink of the hardlinks to the file:
        modifying a data object comprising the given hardlink to the file in accordance with the command received via the user interface element.

2. The method of claim 1 wherein displaying relationships among the hardlinks and the file further comprises displaying at least one icon representing the file and representing the number of hardlinks to the file.

3. The method of claim 1 wherein displaying relationships among the hardlinks and the file further comprises displaying a distinctive icon representing each hardlink to the file having multiple hardlinks.

4. The method of claim 1 further comprising:
    providing the list of hardlinks to the file; and
    providing in the file a pointer to the list of hardlinks.

5. The method of claim 1 wherein identifying hardlinks to the file further comprises
    traversing a hierarchical namespace of the file system.

6. The method of claim 1 further comprising deleting the file and deleting all the hardlinks to the file.

7. The method of claim 1 further comprising renaming the hardlinks to the file, including:
    receiving from a user a new filename; and
    assigning the new filename to the hardlinks in the list of hardlinks to the file.

8. The method of claim 1 further comprising displaying pathnames of the hardlinks to the file, including:
    retrieving a name for each hardlink in the list of hardlinks to the file; and
    traversing a hierarchy for the file system to a root to retrieve a path for each hardlink in the list of hardlinks to the file.

9. An apparatus for graphical display of hardlinks to files in a file system, the apparatus comprising:
    a computer processor;
    a computer memory operatively coupled to the computer processor, the computer memory having disposed within it computer program instructions that, when executed by the computer processor, cause the apparatus to carry out the steps of:
        identifying hardlinks to a file, wherein each of the hardlinks to the file comprises a file system data object including a field representing a link to the file directly mapping the file into a namespace of the file system and a field representing a link to another hardlink pointing to the file, and wherein identifying the hardlinks to the file includes:
            following a pointer from the file to a master hardlink of a list of hardlinks to the file, wherein the file includes a field representing a link to the master hardlink pointing to the file; and
            determining for each hardlink in the list of hardlinks whether each hardlink points to another hardlink by scanning the field representing the link to another hardlink pointing to the file;
        displaying relationships among the hardlinks and the file;
        receiving, via a user interface element, a command to modify the hardlinks to the file; and
        for each given hardlink of the hardlinks to the file:
            modifying a data object comprising the given hardlink to the file in accordance with the command received via the user interface element.

10. The apparatus of claim 9 wherein identifying the hardlinks to the file further comprises traversing the list of hardlinks to the file.

11. The apparatus of claim 9 wherein displaying relationships among the hardlinks and the file further comprises displaying at least one icon representing the file and representing the number of hardlinks to the file.

12. The apparatus of claim 9 wherein displaying relationships among the hardlinks and the file further comprises displaying a distinctive icon representing each hardlink to the file having hardlinks.

13. The apparatus of claim 9 wherein identifying the hardlinks to the file further comprises traversing the list of hardlinks to the file.

14. The apparatus of claim 9 wherein identifying hardlinks to the file further comprises
    traversing a hierarchical namespace of the file system.

15. A computer program product for graphical display of hierarchical hardlinks to files in a file system, the computer program product disposed upon a computer readable storage medium, wherein the computer readable storage medium is not a signal, the computer program product comprising:
    computer program instructions that identify hardlinks to a file, wherein each of the hardlinks to the file comprises a file system data object including a field representing a link to the file directly mapping the file into a namespace of the file system and a field representing a link to another hardlink pointing to the file, and wherein identifying the hardlinks to the file includes:
- following a pointer from the file to a master hardlink of a list of hardlinks to the file, wherein the file includes a field representing a link to the master hardlink pointing to the file; and
- determining for each hardlink in the list of hardlinks whether each hardlink points to another hardlink by scanning the field representing the link to another hardlink pointing to the file;

computer program instructions that display relationships among the hardlinks and the file;

computer program instructions that receive, via a user interface element, a command to modify the hardlinks to the file; and computer program instructions that, for each given hardlink of the hardlinks to the file: modify a data object comprising the given hardlink to the file in accordance with the command received via the user interface element.

16. The computer program product of claim 15 wherein computer program instructions that display relationships among the hardlinks and the file further comprise computer program instructions that display at least one icon representing the file and representing the number of hardlinks to the file.

17. The computer program product of claim 15 wherein computer program instructions that display relationships among the hardlinks and the file further comprise computer program instructions that display a distinctive icon representing each hardlink to the file having multiple hardlinks.

18. The computer program product of claim 15 wherein computer program instructions that identify the hardlinks to the file further comprise traversing the list of hardlinks to the file.

19. The computer program product of claim 15 wherein computer program instructions that identify hardlinks to the file further comprise
- computer program instructions that traverse a hierarchical namespace of the file system.

* * * * *